US006625616B1

(12) United States Patent
Dragon et al.

(10) Patent No.: US 6,625,616 B1
(45) Date of Patent: Sep. 23, 2003

(54) METHOD AND APPARATUS FOR MATERIAL REQUIREMENTS PLANNING

(76) Inventors: Paul Dragon, 7801 W. Rosedale Dr., Homosassa, FL (US) 34448; Rande W. Newberry, 1760 S. Dimensions Ter., Homosassa, FL (US) 34448

( * ) Notice: Subject to any disclaimer, the term of this patent is extended or adjusted under 35 U.S.C. 154(b) by 282 days.

(21) Appl. No.: 09/610,144

(22) Filed: Jul. 5, 2000

(51) Int. Cl.[7] ............................................... G06F 17/30
(52) U.S. Cl. ......................... 707/104.1; 707/3; 707/10; 705/8; 705/22
(58) Field of Search ........................... 705/10, 8, 22, 705/28; 707/104.1, 10, 1, 2, 3, 7, 102, 513, 100, 101; 709/204, 219, 231, 226, 203; 714/35; 717/147; 711/122

(56) References Cited

U.S. PATENT DOCUMENTS

| | | | | |
|---|---|---|---|---|
| 5,369,570 A | * | 11/1994 | Parad | 705/8 |
| 5,787,283 A | * | 7/1998 | Chin et al. | 707/104.1 |
| 5,924,116 A | * | 7/1999 | Aggarwal et al. | 709/204 |
| 5,966,535 A | * | 10/1999 | Benedikt et al. | 707/10 |
| 5,991,802 A | * | 11/1999 | Allard et al. | 709/219 |
| 6,151,582 A | * | 11/2000 | Huang et al. | 705/10 |

\* cited by examiner

*Primary Examiner*—Safet Metjahic
*Assistant Examiner*—Tony Mahmoudi
(74) *Attorney, Agent, or Firm*—Martin Fleit; Paul D. Bianco; Fleit Kain Gibbons Gutman & Bongini P.L.

(57) ABSTRACT

A method and apparatus for materials requirements planning that implements a client/server computer network with an algorithm which enables receiving and preserving input data from the client in a stateless protocol in the server, the input data from a client is preprocessed to determine the MPR state, and stored for each client in the server in a separate side container using stateless protocols. A side container containing a client's data is accessed by distinct SQL and VB code routines to perform specific reports, modification of a required materials order and/or adjustment of material availability for use dates. The preprocessing arranges the input data into record sets of all scheduled material requirements, all currently available and required materials and all unfulfilled ordered materials. The preprocessing is executed via SQL, and the processing is executed via executable code into a temporary record set that is placed into a storage container. The apparatus consists of a server side processor having a network connection and provided with software to supply network server functions, server side general purpose programming functions, and database functions using SQL code. A client side processor connected to the network and provided with software to enable login to the server side processor via the network, and to supply software functions including data access reports and/or modification in order to be able to control server access.

2 Claims, 1 Drawing Sheet

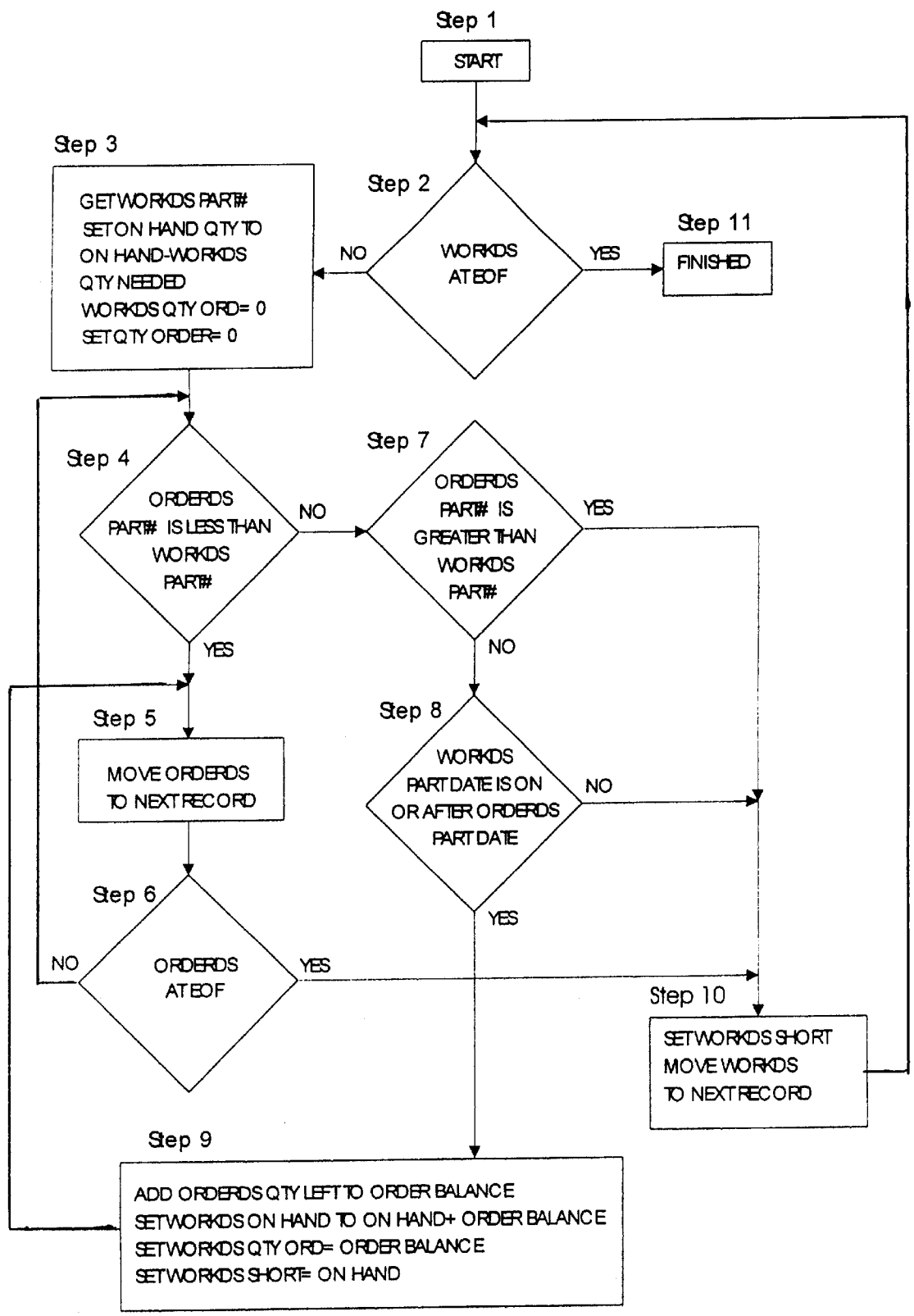

METHOD AND APPARATUS FOR MATERIAL REQUIREMENTS PLANNING

BACKGROUND OF THE INVENTION

1. Field of the Invention

The present invention relates to a method and apparatus for material requirements planning, and, more particularly, to an on-line method and system for material requirements planning that can be accessed from a web site using a net browser with the program software resident on a central processor server.

2. Prior Art

Material Requirements Planning (MRP) is the technique for determining the net time phased requirement of dependent items parts or sub-assemblies from known (e.g. sales orders) or assumed (e.g. sales forecast) independent demand. A Bill of Materials (BOM) is used to define a relationship between the independent demand items at one level and the dependent demand items at the next lower level. In addition, the BOM also is used as the basis for costing and pulling materials from inventory for released work orders. Typically a general-purpose computer operating under software control carries out MRP planning.

In the last two decades, material requirements planning (MRP) have become a common practice in industry for the purposes of production planning and control. The earlier versions of MRP largely focused on managing materials. The same concepts were applied to labor, another important factor in planning. Beyond labor and material, further applications dealt with equipment, tooling and other resources. These variations gave rise to the broader term, manufacturing resource planning, which is often referred to as MRP II. A general type of solution normally involves a mathematical programming formulation, which allows more flexible modeling of the underlying production/inventory process, and, therefore, can handle a wide range of real-world applications.

The state of the art drawbacks are as follows. A major limitation to the use of math programming solutions is often the large size of real-world problems, even though the advances over the years of computer hardware and software have greatly enhanced our ability to solve large-scale math programming problems. Current MRP processing software is processor time intensive, causing the more complete MRP runs to be done overnight. For example, in the system described in U.S. Pat. No. 5,819,232, each day the current inventory level is read from the inventory transaction system. In addition, all of the open orders are read from the order entry transaction system. The demand forecast is regenerated daily using the algorithm describe described in this patent. This inline "Data processing machine" approach, as shown, e.g. in U.S. Pat. No. 4,459,663, has continued to propagate itself through out the prior art MRP problem solving approach. See also, the allocation method for generating a production schedule described in U.S. Pat. No. 5,548,518 and the software system utilizing a filtered priority queue and method of operation" as described in U.S. Pat. No. 6,055,533.

The slowness to accomplish this task in real world time, as described in the prior art, has, and is a principal road block to applying MRP software in a real time environment, such as the Internet, where dynamic modifications of bill of materials (BOM), production scheduling and parts supply change moment by moment. The need to develop a system that can respond to the needs of industry in the above respects remains a significant challenge.

SUMMARY OF THE INVENTION

The main objective of the present invention is to provide a MRP in an applications service provider (ASP), environment, and let a business access a software program across a network, rather than running that software on a local system. By outsourcing a company's software needs, a business does not experience the overhead costs—such as network and computer administration—associated with technology. Using the present invention, customers pay a monthly fee to have their software hosted and maintained by at a central location.

The invention is implemented over the World Wide Web where licensed software can be provided on an Internet link, and the unique program algorithms of the present invention, as described herein, allow rapid data processing. Further, the system of the invention can be installed simply be logging on to the provider site, thus, eliminating the typical on-site software installation required for complex operating software.

The invention constitutes a Materials Requirement Planning (MRP) system which, comprises an applications software program that insures that all the materials required for the manufacture of product will be available according to a schedule. As is known in principle, MRP systems can include modules that assist in control and monitoring other areas in a manufacturing operation. These include scheduling, ordering, inventory control, shop floor control, job costing, document control, quality control and even job quoting and accounting functions. In essence, an MRP system can electronically track all aspects of a manufacturing operation in addition to insuring all materials are on hand when needed.

Although any company that orders materials can use an MRP system, it is especially necessary for a manufacturer where many thousands of line items may be ordered each day. The essential component of the MRP system invention disclosed herein is unique software that is especially adapted and useful for a Contract Manufacturer (CM), as it will meet all of the specialized needs of a CM. Virtually all electronic contract manufacturers (ECM) with sales exceeding $10M use MRP systems. Smaller CM's also utilize an MRP system, or at least some sort of material tracking electronic program. The cost of an individual MRP software system is high.

The concept and object of the present invention, as disclosed herein, is to provide a MRP system that is usable and accessible from a web site by CM's whereby they can avoid the necessary capital expenditure associated with the leasing and installation of a separate software program. In accordance with the present invention, the operating software never leaves the secure central server, and only the information traffic specific to the lessee is seen at the user. In addition to using a more powerful MRP system, the data specific to each lessee is stored in mass memory backup at the server thus providing off site storage of company vital information.

When CM's are on a shared program as provided by the present invention, many advantages are obtained from both CM and its customer viewpoints. The MRP invention disclosed herein anticipates benefiting from more than just the lease. The CM will derive volume purchase power on components, including the correlative advantage of volume rebates and minimum purchase agreement discounts available from component vendors, thus achieving lower component costs from volume purchases. Another advantage is being part of a system that is characterized with uniform component identification system. Typically, each CM has its own internal part numbering system, but to engage in a cooperative effort, the CM normally would be required to use the part number of the manufacturer and/or manufacturers. This gets cumbersome and only "standard or generic" components are easily added. In the past, using this type of cooperation required the EM to do more work, and thus few CM's participated.

Using the MRP invention disclosed herein a significant advantage is achieved; the "work" to pool component purchases for volume discounts is automatic. In fact, the availability and accessibility to components is remarkably easier. In addition, multiple AVL items can be added automatically for approval, instead of having to urgently determine an alternate, and obtain approval, if the ECM finds out the approved AVL item is not available. With ECM's using the MRP invention disclosed herein, the component requirements for all ECM's are pooled into a single source. This provides volume purchase power from component vendors with attendant volume discounts. The ECM also derives reduced component pricing and the added advantages of sourcing from many more vendors than would otherwise be located by a single ECM. In this respect, an ECM normally experiences difficulties getting quotations to prospective customers for new work. The biggest challenge is to turn out an accurate quote in a short time. For example, to provide a quotation on a Printed Circuit Assembly (PCA) requires requesting component pricing and delivery from multiple vendors. When one considers the hundreds of unique components per PCA, and the multiple quoting vendors, it often takes weeks to complete the component pricing. By using the MRP invention disclosed herein, pooled sources and uniform part numbering enable component pricing to be reduced to a few days. A module of the present invention, called BOM Generation, assigns universal component part numbers and contains all the information from customers BOM, plus the entire AVL. Therefore, the data and information needed can be processed by the MRP invention disclosed herein, can be processed by the ECM, or may even be processed by an OEM utilizing the invention; deriving a base line price for the components for their product. The novel module BOM Generation of the present invention can also provide the OEM with the ability to download the numbering system into their PCB design packages, so that the raw data output can include the base line link into the AVL. In essence, this invention allows a small ECM to get the buying power of a vastly larger ECM regarding both price and availability.

With a network of small ECM's working off the same uniform part numbering system, this will attract prospective customers. Original Equipment Manufacturers (OEM's) go to ECM's to provide the electronic circuit cards (PCA's). It is often hard for an OEM to provide each ECM with the correct format of information needed for that ECM to quote the work. Utilizing the present invention it is possible for the OEM to provide one format of information, that all quoting ECM's could utilize, requiring much less work for the OEM. Using the added module of BOM Generation of the MRP invention disclosed herein, allows an OEM to enter its information for a quotation on the "network" and, all interested ECM's in the "network" would have the opportunity to quote the work. This not only provides the ECM with sales leads, ready to quote, but also gives the OEM multiple quotations from one request. Specific Business plan targets.

The objects and advantages of the present invention include providing a novel on line MRP system which enables (a) shop floor/inventory control, (b) BOM processing services, both in generating the working BOM for customers for use in the MRP, including the ability to make BOM items in a format that can import back into CAD programs, so that all future designs contain all information to generate the BOM compatible with the MRP directly from the CAD package, (c) purchasing services using the MRP invention disclosed herein thus, potentially eliminating the customers needs to maintain their own purchasing department, (d) integrating vendors selling methods to buyers purchasing methods, (e) integrating vendors quoting (item price and delivery information) methods to buyers RFQ's, and (f) quoting services to OEM's through on line customers.

Other objects and advantages of the present invention will become more apparent and evident from the following detailed description of a specific embodiment of the invention when taken in conjunction with the appended drawing.

BRIEF DESCRIPTION OF THE DRAWING

The sole FIGURE of the drawing is a flow chart showing the software programming of the server at the central location which is connected to users through the Internet using known security protocol.

DETAILED DESCRIPTION OF PREFERRED EMBODIMENT

In accordance with the present invention, the necessary hardware for the ECM is a LAN (Local Area Network) for PC's in its facility and a web browser to operate the MRP software of the inventive system through a reliable Internet connection, such as an ISDN line, RF link, DSL line or a T1 line.

The system of the present invention includes software for programming the server which works as follows. Server side containers preserve the MRP state, which may then be accessed by different server side SQL & VB code routines to perform specific reports and or modification of the required Material Order issuances and/or adjustment of Material availability for use dates.

The server side containers are held in a stateless environment and user associated by server side session identification in the client/server computer network, such as the World Wide Web (WWW) using stateless protocols, e.g., HTTP.

A client/server MRP algorithm wherein, the MRP software is run on the server, and the results are stored in a temporary storage container. Each user of the MRP can independently run the MRP into a separate storage container. Storage containers may be automatically deleted after a specific period of time. The MRP may further process either all scheduled materials, or just those materials assigned to one or more specific buyers (purchasing agents) departments or corporations.

The MRP operates by preprocessing into record sets/data sets all scheduled material requirements, all currently available and required materials, and all unfulfilled ordered materials. These record sets are then processed, as shown in the block diagram/flow chart of the sole drawing, into a single record set. The preprocessing is executed via SQL, and the process is accomplished via executable code into a temporary record set placed in a storage container. The temporary record set in a storage container can then be post-processed to extract the varied reports and data analyses required for MRP parts ordering/scheduling.

In accordance with the present invention, a computer method/algorithm permits implementation on a client/server computer network in a unique manner to improve calculation speed by use of server side SQL & code, to reduce required bandwidth by use of server side containers and to preserve preprocessed data in a stateless protocol, such as the World Wide Web (WWW), using stateless protocols, e.g., HTTP in the manner shown in U.S. Pat. No. 5,961,601 which is here incorporated by reference. As a result, the invention enables processing a data intensive Material Requirement Planning (MRP) application. By using an advanced novel preprocessing algorithm as taught by the present invention, the inventive system parses those functions best suited to different types of computer software available in a server environment (SQL and ASPNB), and only performs those calculations that are time intensive in the preprocessing thereby achieving substantial time savings, and thus, making mutable iterations and adjustment possible via operator interaction. This removes the requirement to use comparing an item's reaction capacity with a limit above, below which the reaction capacity should lie, see U.S. Pat. No. 5,991,732, and facilitates the operation of JIT (Just In Time) Production systems.

In known systems, database algorithmic intensive software requires a considerable amount of time to "crunch" or process the data through the algorithm. This "time lag" inhibits any database algorithmic intensive software from operating on the WWW (normal internet connection time out is 60 seconds). The present invention solves this problem of the prior art, and can be applied to any database algorithmic intensive software regardless and independent of the database structure or the software algorithm.

The functional requirements of the system of the present invention include the computer requirements of a client side computer such as any "clone PC" containing an internet/intranet connection, such as, a dial up modem, or, such as, a dedicated network connection, such as, an ISDN running a Web Browser compatible with Mozella Standards 4 and up, such as, Microsoft Internet Explorer version 5, or, such as, Netscape version 6. The client side computer needs to access a Website containing the Server side computer while limiting the user to Login and password control, which will permit limits to software functions including data access reports and or modification, in order to be able to control server access, either with or without Secure Socket Layer (SSL), however SSL is preferred.

The requirements of the server side computer or computer Network of computers includes any hardware that will perform the required functions as described, such as, any "server PC" containing an internet/intranet connection, such as a T1 line, running server side Internet/Intranet software to supply Internet Server Functions such as Microsoft IIS 4, to supply server side general purpose programming functions such as ASP running on Microsoft IIS 4 and to supply database functions such as Microsoft SQL 7.

The user input functions required by the present invention, on the client side computer, include product descriptions, Bill of Materials (BOM) for Products containing complete Part#, Approved Vendor List (AVL) containing complete Vendor information of each Part#, Scheduling Product build with Build quantity (KIT QTY) and with a date specified when all parts are to be in house and available for production (PART DATE).

According to the present invention, the structure of the relational database contains the necessary relationship constraints to permit multiple companies to use the same database without being able to view or access each other's information. Further, the algorithm and data process in the server can process ANY type/style of (MRP any actually) Internet computer data intensive algorithm. Also, the system of the invention enables each customer to connect via the Internet and have data segregation.

The specific description of the processing or programming of the server side hardware will now be described in detail with reference to the sole figure of the drawing which shows each step of flowchart. The processing starts with Step 1 which is an instruction to Start the Visual Basic program that first runs 2 SQL programs creating 2 independent data sets or record sets from 2 sets of tables from a relational database. The first record set is called WORKDS (work data set). This data set, WORKDS, contains all current scheduled part usage (PART#) requirements as extracted from the information supplied from the client side including the Bill Of Materials (BOM) for all BOM that are scheduled to be built and not yet started, including current parts availability (ON HAND QTY), the part required date (PART DATE) as determined by the production schedule and Part required quantity (PART QTY) for that date. WORKDS are then sorted in ascending order by PART# first then PART DATE.

The second record set is called ORDERDS (order data set). The second data set, ORDERDS, contains all current open unfulfilled (not all parts are received) parts (PART#), the date specified for delivery of each part (PART DATE) and the Quantity of ordered and not received parts (PART QTY). The data set, ORDERDS, is sorted in ascending order by PART# first then PART DATE.

Step 2 of the program checks to insure that WORKDS is not at the EOF (end of file). If the EOF is true, then either there are no scheduled parts required, or the algorithm has processed all required parts in which case, Step 11 is then executed. If the EOF is false, then there are parts required that have not been processed by the algorithm in which case, Step 3 is then executed.

Step 3 of the program performs the following initialization for the accumulation of part requirement information, ON HAND QTY from the current WORKDS record minus PART QTY in the current WORKDS record and sets the SHORT QTY in the current WORKDS record to the ON HAND QTY from the current WORKDS record minus the ON HAND QTY from the current WORKDS record. Step 3 also sets the ORDER QTY in the current WORKDS record to 0 (zero). If the ORDERDS PART# is less than the WORKDS PART# as determined in Step 4, then, Step 5 is executed. If the ORDERDS PART# greater than or equal to the WORKDS PART# in Step 4, then Step 7 is executed.

In Step 5 the ORDERDS is advanced to the next available record. Step 6 then checks to insure that ORDERDS is not at the EOF (end of file). If the EOF is true, then either there are no more parts of that PART# on order or the task is finished. Step 10 is then executed. If the EOF is false, then there are parts or more parts of that PART# on order that have not been processed by the algorithm. The program loops back to Step 4 which is then executed.

Step 7 compares the PART# value of the current ORDERDS record to the PART# value of the current WORKDS record. If the ORDERDS PART# is greater than the WORKDS PART#, then, Step 10 is executed. If the ORDERDS PART#is equal to the WORKDS PART#, then, Step 8 is executed.

Step 8 compares the PART DATE value of the current ORDERDS record to the PART DATE value of the current WORKDS record. If the ORDERDS PART DATE is the same as or before the WORKDS PART DATE, then, Step 9 is executed. If the ORDERDS PART DATE is after the WORKDS PART DATE, then, Step 10 is executed. Step 9 is used to perform the following functions. Add the PART QTY from the current ORDERDS record to the ON HAND QTY from the current WORKDS record; Add the PART QTY in the current ORDERDS record to the ORDER QTY in the current WORKDS record; and Set the SHORT QTY in the current WORKDS record to the ON HAND QTY from the current WORKDS record.

In Step 10 of the program, the WORKDS is advanced to the next available record, and the program loops back to Step 2. Step 11 closes the ORDERDS and stores the WORKDS in a container.

The implementation of preferred embodiment is as follows.

Step 1 Star VB Code
   Set With Dimension Variables
   Dim userDB As Database
   Dim selQuery As QueryDef, workDS As Recordset
   Dim orderQuery As QueryDef, orderDS As Recordset
   Dim IDstore As Long
   Dim SWitch As Integer
   Dim SWorderAs Integer
   Dim DocName As String
   Dim workbalance As Long, orderbalance As Long
   Set Up Container Empty With SQL
   DocName="MRP table clear"
     DELETE MRP.*
     FROM MRP;
   DoCmd.OpenQuery DocName, A_NORMAL, A_EDIT
   Load Primarily Data into Container With SQL
   DocName="MRP sch parts req vrs Ordered"
     INSERT INTO MRP
       (PartNumber, ID_Num, PartDate, OnHand, QtyNeeded, QtyOrd, Qty_Short, OrdMe, OrdCnt, SelVen, SupplierID, Costis, Lead_Time, MIN_Order_Qty, Bulk, Package, EmployeeID)
     SELECT
     [Stock Room].PartNumber,
     [Stock Room].ID_Num,
     [sch parts required].PartDate,
     [count]+llf(IsNull([QtyInComing]),0,[QtyInComing])–llf(IsNull([Qty_Short]),0,[Qty_Short])AS OnHand,
     [sch parts required].QtyNeeded,
     0 AS QtyOrd,
     0 AS Qty_Short, False AS OrdMe,
     Count([Order Details OPEN].[Required Date]) AS OrdCnt,
     [Costing by Selected Vendor].Vendors AS SelVen,
     [Costing by Selected Vendor].SupplierID,
     [Costing by Selected Vendor].CostIs,
     [Costing by Selected Vendor].Lead Time,
     [Costing by Selected Vendor].MIN,
     [Costing by Selected Vendor].Bulk,
     [Costing by Selected Vendor].Package,
     [Costing by Selected Vendor].BuyerID AS EmployeeID
     FROM (((([Stock Room]
     LEFT JOIN [sch parts required] ON [Stock Room].ID_Num=[sch parts required].ID_Num)
     LEFT JOIN [Parts on floor] ON [Stock Room].ID_Num=[Parts on floor].PartID)
     LEFT JOIN [Order Details OPEN] ON [Stock Room].ID_Num=[Order Details OPEN].[Revco Part ID])
     LEFT JOIN [Costing by Selected Vendor] ON [Stock Room].ID_Num=[Costing by Selected Vendor].ID_Num)
     LEFT JOIN [MRP sch parts in coming] ON [Stock Room].ID_Num=[MRP sch parts in coming].[Revco Part ID]
     GROUP BY [Stock Room].PartNumber, [Stock Room].ID_Num, [sch parts required].PartDate, [count]+llf(IsNull([QtyInComing]),0,[QtyInComing])–llf(IsNull([Qty_Short]),0,[Qty_Short]), [sch parts required].QtyNeeded, 0, 0, False, [Costing by Selected Vendor].Vendors, [Costing by Selected Vendor].SupplierID, [Costing by Selected Vendor].CostIs, [Costing by Selected Vendor].Lead_Time, [Costing by Selected Vendor].MIN, [Costing by Selected Vendor].Bulk, [Costing by Selected Vendor].Package, [Costing by Selected Vendor].BuyerID
     HAVING ((([sch parts required].QtyNeeded) Is Not Null))
     ORDER BY [Stock Room].ID_Num, [sch parts required].PartDate;
DoCmd.OpenQuery DocName, A_NORMAL, A_EDIT
Set Up and Start 1st SQL
Set userDB=CurrentDb
Set selQuery=userDB.QueryDefs("[MRP Query]")
   SELECT MRP.ID_Num, MRP.PartDate, MRP.PartNumber, MRP.OnHand, MRP.QtyNeeded, MRP.QtyOrd, MRP.Short
   FROM MRP
   ORDER BY MRP.ID_Num, MRP.PartDate;
Set workDS=selQuery.OpenRecordset(DB_OPEN_DYNASET)
Set Up and Start 2nd SQL
Set orderQuery=userDB.QueryDefs("[Order Receive Details Sum]")
   SELECT DISTINCTROW
   [Order Details from POs].OrderID,
   [Order Details from POs].OrderDetailID,
   [Order Details from POs].PartNumberID,
   tbl_Parts.PartNumber,
   [Order Details from POs].[Required Date],
   [Order Receive Details sum pre].SumOfQuantity,
   [Order Details from POs].Quantity,
   [Order Details from POs].[Quantity]–llf(IsNull([SumOfQuantity]),0,[SumOfQuantity]) AS QtyLeft,
   [Order Details from POs].UnitPrice,
   [Order Details from POs].SalePrice,
   llf(IsNull([MaxOfReceiced Date]), [Required Date], [MaxOfReceiced Date]) AS LastRecDate
   FROM [Orders from POs]
   INNER JOIN ((([Order Details from POs]
   LEFT JOIN [Order Receive Details sum pre] ON [Order Details from POs].OrderDetailID=[Order Receive Details sum pre].OrderDetailID)
   LEFT JOIN tbl_Parts
   ON [Order Details from POs].PartNumberID=tbl_Parts.ID_Num)
   ON [Orders from POs].OrderID=[Order Details from POs].OrderID
   WHERE ((([Order Details from POs].PartNumberID)>0)
   AND (([Order Details from POs].Quantity)>0)
   AND (([Orders from POs].Complete)=No)
   AND (([Order Details from POs].Closed)=No))

ORDER BY [Order Details from POs].PartNumberID,
[Order Details from POs].[Required Date], [Order Details from POs].OrderDetailID,
IIf(IsNull([MaxOfReceiced Date]),[Required Date], [MaxOfReceiced Date]);
Set orderDS=orderQuery.OpenRecordset(DB_OPEN_DYNASET)

Step 2 Start Process

Checks to Insure that WORKDS is not at the EOF (End of File)

If Not workDS.EOF Then
workDS.MoveFirst
SWorder=orderDS.EOF
If Not SWorder Then orderDS.MoveFirst Step 3 Performs the Following Initialization for the Accumulation of Part Requirement Information.

Do Until workDS.EOF
IDstore=workDS!ID_Num
workbalance=workDS![OnHand]

Step 4 Compares the PART# Value of the Current ORDERDS Record to the PART# Value of the Current WORKDS Record.

Do
SWitch=workDS.EOF
If Not SWitch Then
SWitch=workDS!ID_Num <> IDstore
End If
If Not SWitch Then
workDS.Edit
workDS![OnHand]=workbalance
workDS.Update
Do Until Sworder Step 7 Compares the PART# Value of the Current ORDERDS Record to the PART# Value of the Current WORKDS Record.

If IDstore <=orderDS![PartNumberID] Then
SWorder=True
Else
orderDS.MoveNext
SWorder=orderDS.EOF
End If
Loop
SWorder=orderDS.EOF
orderbalance=0
Do Until Sworder Step 8 Compares the PART DATE Value of the Current ORDERDS Record to the PART DATE Value of the Current WORKDS Record.

If DateDiff("d", workDS![PartDate], orderDS![Required Date]) <=0 And IDstore=orderDS![PartNumberID] Then
orderbalance=orderbalance+orderDS![QtyLeft]

Step 5 The ORDERDS is Advanced to the Next Available Record.

orderDS.MoveNext

Step 6 Checks to Insure That ORDERDS is not at the EOF (End of File).

SWorder=orderDS.EOF
Else
SWorder=True
End If
Loop
SWorder=orderDS.EOF

Step 9 is Used to Perform the Following Functions.

workbalance=workbalance+orderbalance−workDS![QtyNeeded]
workDS.Edit
workDS("QtyOrd")=orderbalance
workDS("Short")=workbalance
workDS.Update Step 10 The WORKDS is Advanced to the Next Available Record.

workDS.MoveNext
End If
Loop Until SWitch
Loop
End If

Step 11 Closes the ORDERDS and Stores the WORKDS in a Container.

workDS.close
orderDS.close
Clean Up Close and Exit
Exit_prt_Click:
Exit Sub
Err_prt_Click:
MsgBox Error$
Resume Exit_prt_Click
End Sub

DEFINITIONS:

AVL—Approved Vendor List. This is a list of manufacturers and their part numbers that has been approved for use by the ECM's customer for a particular product. AVL's are very important since there are typically many manufacturers for any given component, and the specifications for each may be slightly different. The customer has tested their products using specific components, and in most cases will only allow these tested or approved components to be installed in their products. It is desirable to have as many approved manufacturers and part numbers for any given component as possible. The reasons are competitive pricing and availability.

ASP—Applications Service Providers

BOM—Bill of Materials, a complete list of all items required to manufacture and build an item or product.

CAD—Computer Aided Design

CM=Contract Manufacturer

ECM—Electronic Contract Manufacturer, also abbreviated to CM or Contract Manufacturer HTTP—Hyper Text Transfer Protocol, used by the Internet LAN—Local Area Network JIT—Just In Time Production systems where parts required arrive just in time for their usage.

MRP—Materials Requirement Planning. A systematic method to ensure the correct quantity of the correct materials that are required to produce a product will be on hand, when the product is scheduled to be built. The MRP must include what is in stock (and not allocated for another product), what is on order (and the delivery date) what may be in process and can be Returned to Stock (RTS) and what needs to be ordered and when (based on lead times).

NCNR—Non Cancelable Non Returnable components from vendors. Typically these are components that are customer specific, or not commonly used. The area between common and not common components varies from vendors, but typically if the component has resale market through that vendors base customers it may be considered common, if less than 4 of the vendors customers use the item regularly, it may be considered not common.

OEM—Original Equipment Manufacturer

PC—Personnel Computer

PCA—Printed Circuit Assembly

RFQ—Request For Quotation

RMA—Return Material Authorization

RTS—Return To Stock. Electronic components often come in large packages set up for automatic installation, example, chip components may have a reel size of 10,000 pieces. In most instances the lot size of product to be built is less than these package sizes. The component package size, minus the quantity of components used for the build (considering potential manufacturing component fall out) can be considered available stock. If the current build is timely with the scheduled build, these components should be considered RTS components when the MRP is run.

SQL—Sequential Query Language

VB—Visual Basic

WWW—World Wide Web or Internet

The programs used in the present invention, see sole figure, may be stated as follows. The correlation between the following programs and the process and method described above in detail and the implementation of the routines or programs will be readily apparent to those skilled in the art.

1. Order Details OPEN

SELECT
  [Order Details from POs].[Revco Part ID],
  [Order Details from POs].[Required Date],
  [Order Details from POs].Quantity,
  Sum([Order Receive Details].Quantity) AS QtyRec
FROM ([Orders from POs]
INNER JOIN [Order Details from POs]
ON [Orders from POs].OrderID=[Order Details from POs].OrderID)
LEFT JOIN [Order Receive Details]
ON [Order Details from POs].OrderDetailID=[Order Receive Details].OrderDetailID
GROUP BY [Order Details from POs].[Revco Part ID],
  [Order Details from POs].[Required Date],
  [Order Details from POs].Quantity,
  [Order Details from POs].Closed,
  [Orders from POs].Complete
HAVING ((([Order Details from POs].[Revco Part ID])>0)
AND (([Order Details from POs].Quantity)>0)
AND (([Order Details from POs].Closed)=No)
AND (([Orders from POs].Complete)=No))
ORDER BY [Order Details from POs].[Revco Part ID],
  [Order Details from POs].[Required Date];

2. Order Receive Details sum

SELECT DISTINCTROW
  [Order Details from POs].OrderID,
  [Order Details from POs].OrderDetailID,
  [Order Details from POs].[Revco Part ID],
  tbl_Parts.[Revco P/N],
  [Order Details from POs].[Required Date],
  [Order Receive Details sum pre].SumOfQuantity,
  [Order Details from POs].Quantity,
  [Order Details from POs].[Quantity]-IIf(IsNull([SumOfQuantity]),0,[SumOfQuantity]) AS QtyLeft,
  [Order Details from POs].UnitPrice,
  [Order Details from POs].SalePrice,
  IIf(IsNull([MaxOfReceicedDate]),[Required Date],[MaxOfReceiced Date]) AS LastRecDate
FROM [Orders from POs]
INNER JOIN ((([Order Details from POs]
LEFT JOIN [Order Receive Details sum pre] ON [Order Details from POs].OrderDetailID=[Order Receive Details sum pre].OrderDetailID)
LEFT JOIN tbl_Parts
ON [Order Details from POs].[Revco Part ID]=tbl_Parts.[ID Num])
ON [Orders from POs].OrderID=[Order Details from POs].OrderID
WHERE ((([Order Details from POs].[Revco Part ID])>0)
AND (([Order Details from POs].Quantity)>0)
AND (([Orders from POs].Complete)=No)
AND (([Order Details from POs].Closed)=No))
ORDER BY [Order Details from POs].[Revco Part ID],
  [Order Details from POs].[Required Date], [Order Details from POs].OrderDetailID,
  IIf(IsNull([MaxOfReceicedDate]),[Required Date],[MaxOfReceicedDate]);

3. Sch parts required

SELECT DISTINCTROW
  tbl_Parts.[ID Num],
  [Sch Build Start Dates].PartDate,
  Sum([QTY]*[Quanitiy]) AS QtyNeeded
FROM Products
INNER JOIN ((Orders INNER JOIN [Order Details]
ON Orders.OrderID=[Order Details].OrderID)
INNER JOIN (tbl_Parts
INNER JOIN ([Sch Build Start Dates]
INNER JOIN tbl_Bom
ON [Sch Build Start Dates].ProductID=tbl_Bom.ProductID)
ON tbl_Parts.[ID Num]=tbl_Bom.[Part ID])
ON [Order Details].OrderDetailID=[Sch Build Start Dates].OrderDetailID)
ON Products.ProductID=[Sch Build Start Dates].ProductID
GROUP BY tbl_Parts.[ID Num],
  [Sch Build Start Dates].PartDate,
  [Sch Build Start Dates].KitStatus,
  [Sch Build Start Dates].Completed,
  Orders.Active,
  [Order Details].Active,
  Products.TurnKey
HAVING (((([Sch Build Start Dates].PartDate) Is Not Null)
AND (([Sch Build Start Dates].KitStatus)=0)
AND (([Sch Build Start Dates].Completed)=No)

```
        AND ((Orders.Active)=Yes)
        AND (([Order Details].Active)=Yes)
        AND ((Products.TurnKey)=Yes))
    ORDER BY tbl_Parts.[ID Num], [Sch Build Start Dates].
        PartDate;
4. MRP sch parts req vrs Ordered
INSERT INTO MRP
    ([Revco P/N], [ID Num], PartDate, OnHand, QtyNeeded,
        Qtyord, [Short], OrdMe, OrdCnt, SelVen, SupplierID,
        Costis, [Lead Time], [MIN], Bulk, Package,
        EmployeeID)
SELECT
    [Stock Room].[Revco PIN],
    [Stock Room]. [ID Num],
    [sch parts required].PartDate,
    [count]+llf(IsNull([QtyInComing]),0,[QtyInComing])-
        llf(IsNull([Qty_Short]),0,[Qty_Short])
    AS OnHand, [sch parts required].QtyNeeded,
    0 AS QtyOrd,
    0 AS [Short], False AS OrdMe,
    Count([Order Details OPEN]. [Required Date]) AS
        OrdCnt,
    [Costing by Selected Vendor].Vendors AS SelVen,
    [Costing by Selected Vendor]. SupplierID,
    [Costing by Selected Vendor].CostIs,
    [Costing by Selected Vendor]. [Lead Time],
    [Costing by Selected Vendor].MIN,
    [Costing by Selected Vendor].Bulk,
    [Costing by Selected Vendor].Package,
    [Costing by Selected Vendor].BuyerID AS EmployeeID
    FROM (((([Stock Room]
    LEFT JOIN [sch parts required] ON [Stock Room].[ID
        Num]=[sch parts required].[ID Num])
    LEFT JOIN [Parts on floor] ON [Stock Room].[ID
        Num]=[Parts on floor].PartID)
    LEFT JOIN [Order Details OPEN] ON [Stock Room].[ID
        Num]=[Order Details OPEN].[Revco Part ID])
    LEFT JOIN [Costing by Selected Vendor] ON [Stock
        Room]. [ID Num]=[Costing by Selected Vendor]. [ID
        Num])
    LEFT JOIN [MRP sch parts in coming] ON [Stock
        Room]. [ID Num]=[MRP sch parts in coming]. [Revco
        Part ID]
    GROUP BY [Stock Room].[Revco P/N], [Stock Room].
        [ID Num], [sch parts required].PartDate,
    [count]+llf(IsNull([QtyInComing]),0,[QtyInComing])-
        llf(IsNull([Qty_Short]),0,[Qty_Short]), [sch parts
        required].QtyNeeded, 0, 0, False, [Costing by Selected
        Vendor].Vendors, [Costing by Selected Vendor].
        SupplierID, [Costing by Selected Vendor].CostIs,
        [Costing by Selected Vendor].[Lead Time], [Costing by
        Selected Vendor].MIN, [Costing by Selected Vendor].
        Bulk, [Costing by Selected Vendor].Package, [Costing
        by Selected Vendor].BuyerID
    HAVING ((([sch parts required].QtyNeeded) Is Not
        Null))
    ORDER BY [Stock Room].[ID Num], [sch parts
        required]. PartDate;

5. VB code
Private Sub prt_Click( )
On Error GoTo Err_prt_Click
Dim userDB As Database
Dim selQuery As QueryDef, workDS As Recordset
Dim orderQuery As QueryDef, orderDS As Recordset
Dim IDstore As Long
Dim SWitch As Integer
Dim SWorder As Integer
Dim DocName As String
Dim workbalance As Long, orderbalance As Long
Me![Status]="Creating MRP List"
DoEvents
DoCmd.Hourglass True
DoCmd.SetWarnings False
DocName="MRP table clear"
DoCmd.OpenQuery DocName, A_NORMAL, A_EDIT
DocName="MRP sch parts req vrs Ordered"
DoCmd.OpenQuery DocName, A_NORMAL, A_EDIT
DoCmd.SetWarnings True
Set userDB=CurrentDb
Set selQuery=userDB.QueryDefs("[MRP Query]")
selQuery.Parameters("WhatID")=Me![BuildID]
Set workDS=selQuery.OpenRecordset(DB_OPEN_
    DYNASET)
Set orderQuery=userDB.QueryDefs("[Order Receive
    Details sum]")
Set orderDS=orderQuery.OpenRecordset(DB_OPEN_
    DYNASET)
If Not workDS.EOF Then
    workDS.MoveFirst
    SWorder=orderDS.EOF
    If Not SWorder Then orderDS.MoveFirst
Do Until workDS.EOF
    IDstore=workDS![ID Num]
    workbalance=workDS![OnHand]
    Me![Status]=workDS![Revco P/N]
    DoEvents
Do
    SWitch=workDS.EOF
    If Not SWitch Then
        SWitch=workDS![ID Num] <> IDstore
    End If
    If Not SWitch Then
        workDS.Edit
        workDS![OnHand]=workbalance
        workDS.Update
    Do Until SWorder
        If IDstore <=orderDS![Revco Part ID] Then
            SWorder=True
        Else
            orderDS.MoveNext
            SWorder=orderDS.EOF
        End If
    Loop
    SWorder=orderDS.EOF
    orderbalance=0
    Do Until SWorder
        If workDS![PartDate] >=orderDS![Required
            Date] And IDstore=orderDS![Revco Part ID]
            Then
```

```
If DateDiff("d", workDS![PartDate], orderDS!
    [Required Date])<=0 And IDstore=orderDS!
    [Revco Part ID] Then
    orderbalance=orderbalance+orderDS!
    [QtyLeft]
    orderDS.MoveNext
    SWorder=orderDS.EOF
Else
    SWorder=True
End If
    Loop
    SWorder=orderDS.EOF
    workbalance=workbalance+orderbalance-
    workDS![QtyNeeded]
    workDS.Edit
    workDS("QtyOrd")=orderbalance
    workDS("Short")=workbalance
    workDS.Update
    workDS.MoveNext
End If
Loop Until SWitch
Loop
End If
Me![Status]="Finished"
workDS.close
orderDS.close
DoCmd.Hourglass False
Exit_prt_Click:
    DoCmd.Hourglass False
    Exit Sub
Err_prt_Click:
    MsgBox Error$
    Resume Exit_prt_Click
End Sub
```

Although the invention has been described in terms of a specific preferred embodiment, nevertheless, changes and modifications will be evident to those skilled in the art from a knowledge of the disclosure and teachings herein. Such changes and modifications as are apparent to those skilled in the art are deemed to come within the purview of the invention as claimed.

What is claimed is:

1. Apparatus for materials requirements planning comprising;

a) a server side processor having a network connection and provided with software to supply network server functions, server side general purpose programming functions, and database functions using SQL code, b) a client side processor connected to the network and provided with software to enable login to the server side processor via the network, and to supply software functions including data access reports and/or modification in order to be able to control server access, c) the client side processor being enabled to input data including product descriptions, bill of materials for products containing complete part numbers, an approved vendor list containing complete vendor information for each part number, schedule of the product being built with the quantity required and the date when parts are available for production, d) the server side processor initiating a Visual Basic program that runs 2 SQL programs creating two independent data sets from 2 sets of tables from a relational database, i. one independent data set being a work data set containing all current scheduled part usage requirements, current parts availability, the part required date as determined from the production schedule, and the part quantity required for that date, and then sorting by part number in ascending order by part number first and then by part date, and ii. the second independent data set being an order data set containing all current open unfulfilled parts, the date specified for delivery, and the quantity ordered, but not received.

2. Apparatus according to claim 1 further comprising a program running on the server side processor that processes the two independent data sets to enable reports to be obtained regarding the condition of the MRP.

* * * * *